United States Patent [19]
Natarajan et al.

[11] Patent Number: 5,790,070
[45] Date of Patent: Aug. 4, 1998

[54] NETWORK AND METHOD FOR CONTROLLING STEERABLE BEAMS

[75] Inventors: Kadathur S. Natarajan, Willmette, Ill.; Randy Lee Turcotte, Tempe; Sergio Aguirre, Phoenix, both of Ariz.

[73] Assignee: Motorola, Inc., Schaumburg, Ill.

[21] Appl. No.: 851,262

[22] Filed: May 5, 1997

[51] Int. Cl.$^6$ .................................................. H04B 7/185
[52] U.S. Cl. ......................... 342/354; 455/13.3; 455/428; 455/430
[58] Field of Search ........................ 342/354; 455/13.3, 455/428, 430

[56] References Cited

U.S. PATENT DOCUMENTS 4,931,802  6/1990  Assal et al. ........................... 342/356
5,584,046  12/1996  Martinez et al. ...................... 455/13.1

*Primary Examiner*—Theodore M. Blum
*Attorney, Agent, or Firm*—Harold C McGurk

[57] ABSTRACT

A satellite communication network (10) coordinates multiple steerable satellite beams (28) with user requests for connections requiring varying bandwidth in real-time. A control station (22) gathers user requests for connections (64) and transmits those requests (70) to a satellite (20) over an uplink (70). Requests for bandwidth (72) are processed in the satellite (20) where time slot assignments (74) and steerable beam schedules (84) are determined in response to user requests (74). Steerable beam schedule (84) and time slot assignments (74) are transmitted to subscriber units (24) and control station (22) over a broadcast downlink (86). Subscriber units (24) complete a data transfer interval of a call (62) while a steerable beam schedule (84) is executed in real-time.

19 Claims, 5 Drawing Sheets

| BEAM | T/R PARAM | MICRO-CELL | START TIME | DURATION | SU | START TIME | DURATION |
|---|---|---|---|---|---|---|---|
| BEAM #1 - MACROCELL | | — | — | — | — | — | — |
| | | | | | — | — | — |
| | | | | | ⋮ | ⋮ | ⋮ |
| | | — | — | — | — | — | — |
| | | | | | — | — | — |
| | | | | | ⋮ | ⋮ | ⋮ |
| | | ⋮ | ⋮ | ⋮ | ⋮ | ⋮ | ⋮ |
| BEAM #2 - MACROCELL | | — | — | — | — | — | — |
| | | | | | — | — | — |
| | | | | | ⋮ | ⋮ | ⋮ |
| | | — | — | — | — | — | — |
| | | | | | — | — | — |
| | | | | | ⋮ | ⋮ | ⋮ |
| | | ⋮ | ⋮ | ⋮ | ⋮ | ⋮ | ⋮ |

NETWORK AND METHOD FOR CONTROLLING STEERABLE BEAMS

FIELD OF THE INVENTION

The present invention relates to communication networks. More specifically, the present invention relates to the efficient sharing of access links within a communication network.

BACKGROUND OF THE INVENTION

In telecommunication networks, it is desirable to send various types of data in addition to voice communications between subscriber units. The various types of data may or may not require real-time constraints and they may have unique data rate requirements. The transceiving of a variety of types of data creates a need for more efficient sharing of network resources to accommodate a large quantity and variety of traffic demands. With increasing and widely ranging bandwidth requirements at contemporary data transmission rates and with increasing varieties of data transmission requirements, the existing methods are unsuitable because they are not responsive enough to user requests.

Some communication networks have attempted to accommodate traffic demands by permanently dedicating one or more channels exclusively to handling various types of data traffic. While this technique may reduce the initial time required to access channels, using dedicated channels permanently removes those channels from a "pool" of usable and otherwise available channels. The use of dedicated channels is also wasteful of spectral resources. Moreover, those systems that employ dedicated channels lack the capacity to dynamically redistribute or allocate the traffic load across the dedicated channels. A lack of responsiveness to specific bandwidth requirements leads to allocating excess network resources for many applications to meet worst case conditions. Such allocation practices reveal a certain inflexibility and inefficiency in networks currently in use.

Steerable antennas in existing satellite networks have been used in some networks in an attempt to accommodate widely dispersed user traffic. The use of steerable antennas in some systems has been limited to relatively predetermined (i.e., fixed) patterns. However, such systems are unable to respond to user requests for increased bandwidth and/or an increased variety of data calls.

BRIEF DESCRIPTION OF THE DRAWINGS

FIG. 6 shows a sample listing of an exemplary steerable beam schedule.

DETAILED DESCRIPTION OF THE DRAWINGS

Figure 1:
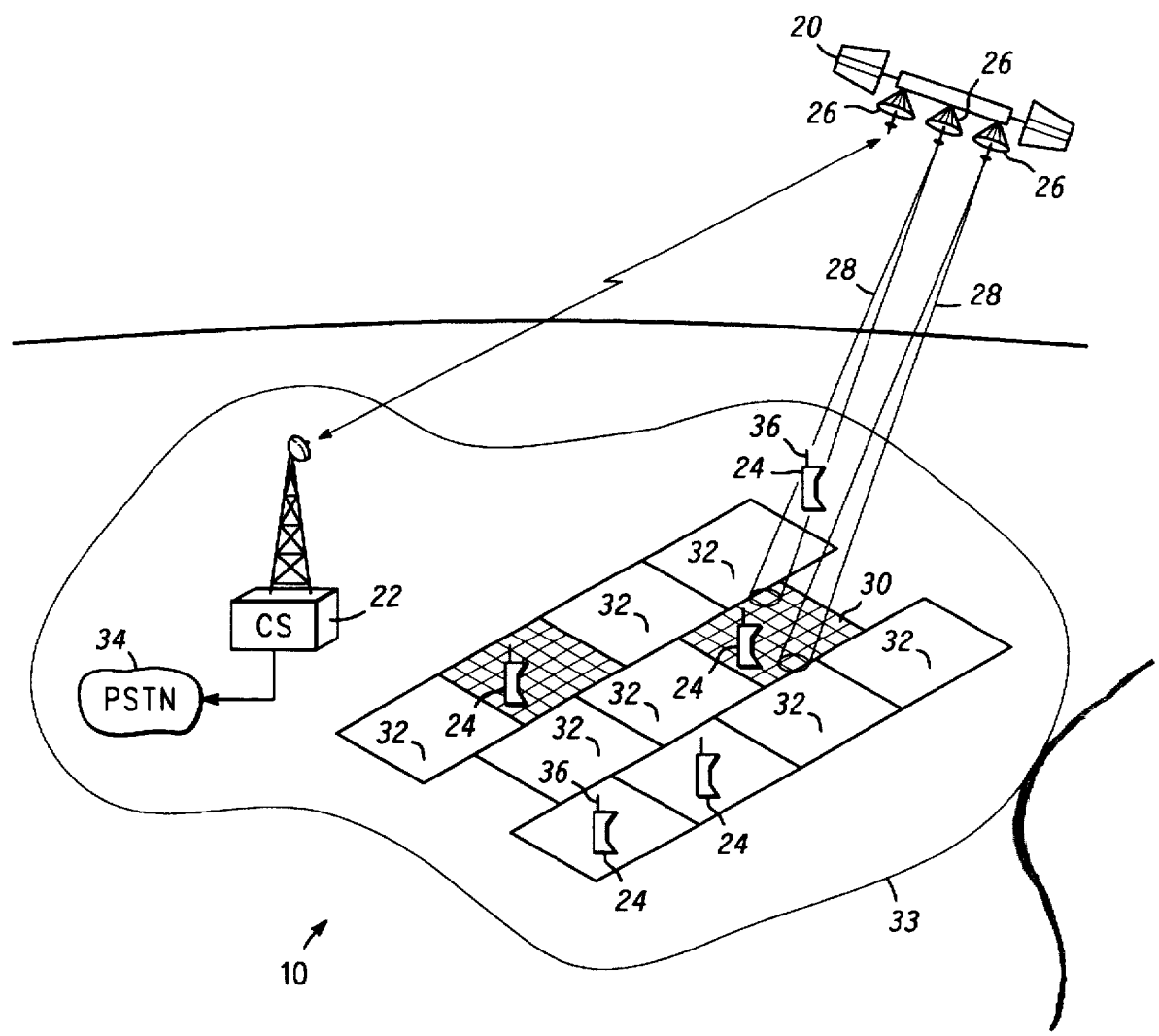
FIG. 1 shows a layout diagram of an environment within which a radio frequency telecommunications network employing a control station and a satellite with steerable beams operates according to a preferred embodiment of the present invention.

FIG. 1 shows a layout diagram of an environment within which radio frequency telecommunications network 10

2 operates. Network 10 includes preferably several satellites 20 placed in relatively low or stationary orbits around the earth. For clarity, FIG. 1 shows only one of satellites 20. Each satellite 20 is a network node that communicates with at least one earth control station 22, with multiple subscriber unit earth stations 24, and with other neighboring satellites 20. For each satellite 20, a multiplicity of communication links with subscriber units 24 are multiplexed together at a single satellite 20. In the preferred embodiment of the invention, satellite 20 has a number of steerable antennas 26 that project a corresponding number of independently steerable beams 28 over a number of cells. Those skilled in the art recognize a steerable beam is sometimes referred to as a "hopping" beam, and the two terms are used interchangeably herein.

Network 10 has any number of subscriber units 24 grouped together in relatively small geographical areas called microcells 30. A grouping of a number of microcells 30 forms macrocell 32. Macrocells 32 are logical constructions of dynamic entities whose shapes and borders are constantly changing in time. FIG. 1 illustrates macrocells 32 as being a contiguous grouping of microcells 30, but this is not a requirement. In the preferred embodiment of this invention one steerable beam services one macrocell 32. A grouping of multiple macrocells 32 forms footprint 33, which represents the entire radio coverage area for one satellite 20.

For convenience, FIG. 1 illustrates microcells 30 as small squares or rectangles without overlaps or gaps residing within macrocells 32. However, those skilled in the art will understand that in actual practice, equal strength lines projected from satellite antennas may have a shape far different than a square or rectangle, that antenna side lobes may distort the pattern, that some microcells 30 may cover larger areas than other microcells 30, and that some degree of overlap between adjacent microcells 30 may be expected.

Network 10 includes any number, potentially in the millions, of subscriber units 24. Subscriber units 24 may be configured as conventional portable radio communication equipment. In other words, subscriber units 24 may be battery powered, may consume relatively low power, and may include relatively small antennas 36. Subscriber units 24 may also be configured to transmit and receive voice, data, video, and/or other types of communications. Subscriber units 24 may also be fixed ground terminals. Subscriber units 24 may have many other different configurations which are well known to those skilled in the art.

Satellite 20 communicates through network 10 with subscriber units 24 using a relatively limited amount of the electromagnetic spectrum. The precise parameters of this spectrum are unimportant to the present invention, and may vary from system to system. The present invention divides this spectrum into discrete portions or channel sets. For example, the spectrum may be divided into discrete frequency bands, discrete time slots, discrete coding techniques, diverse polarities, or a combination thereof. The precise manner of dividing this spectrum is also unimportant to the present invention. Desirably, each of these discrete channel sets is "orthogonal" to all other channel sets. In other words, simultaneous communications may take place at a common location over every channel set without significant interference. The preferred embodiment of this invention assigns channel sets to macrocells 32 using a frequency, spatial, coding, and/or polarity diversity scheme that prevents interference between macrocells 32. Within macrocell 32, microcells 30 and subscriber units 24 have individual communication links to satellite 20 that are prevented from interfering with each other by time diversity or spread spectrum coding.

FIG. 1 shows network 10 additionally including one or more control stations 22, residing on or near the surface of the earth. Control station 22 communicates with satellites 20 and with public switched telecommunication network (PSTN) 34. Through satellites 20, control station 22 communicates with subscriber units 24. Calls directed toward subscriber units 24 in network 10 may be received from PSTN 34 and conversely, subscriber units 24 may also send calls through PSTN 34. Control station 22 performs the general functions of gathering call request information from subscriber units 24, transmitting certain call request information to satellite 20 for processing, and setting up and monitoring call connections through network 10.

Figure 2:
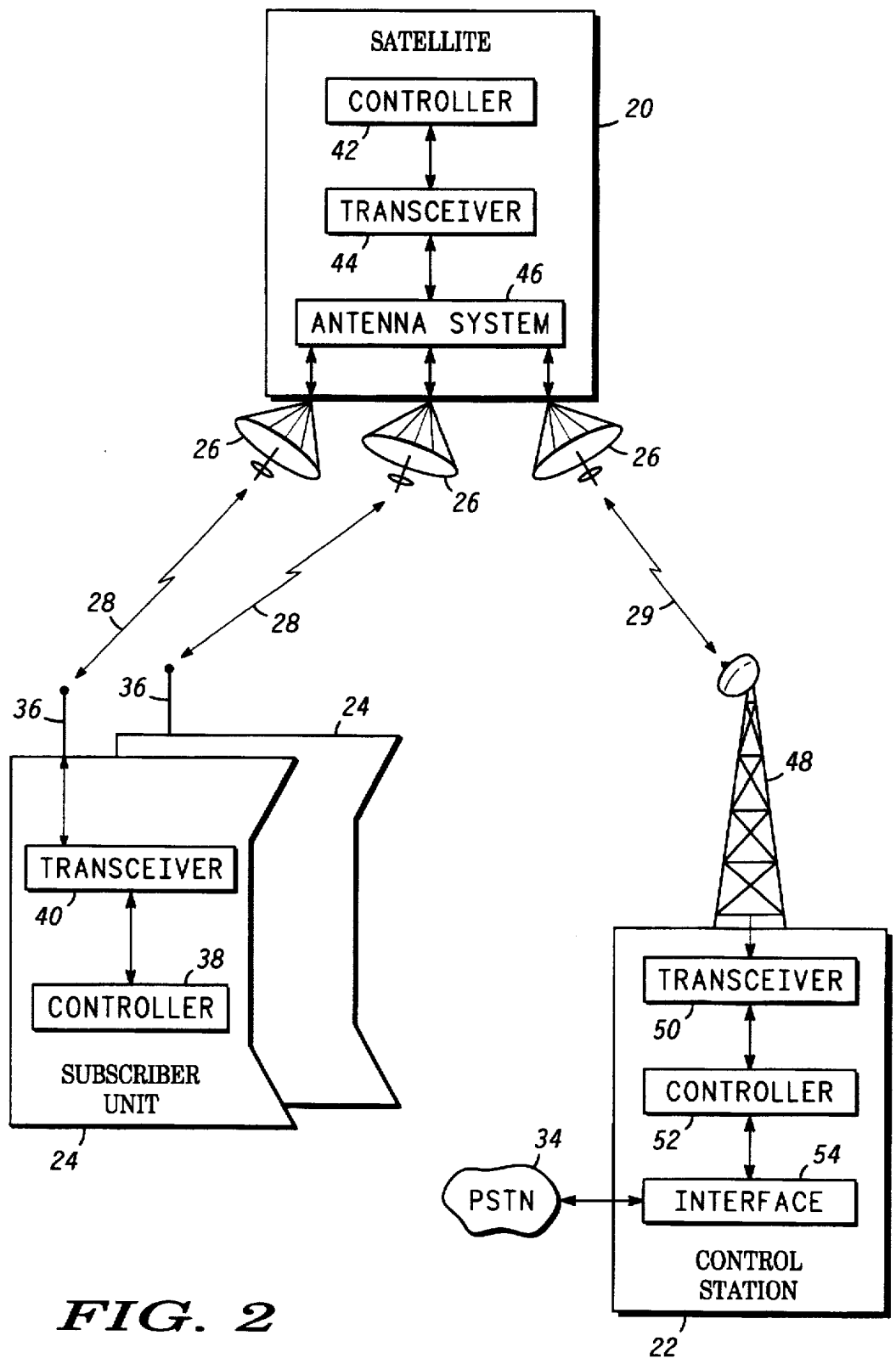
FIG. 2 shows a block diagram of a satellite in communication with a control station and a subscriber unit.

FIG. 2 shows a block diagram of satellite 20 in communication with control station 22 and two subscriber units 24. Each subscriber unit 24 contains digital controller 38 coupled bidirectionally to an input and an output of transceiver 40. Controller 38 is desirably configured as one or more conventional microprocessor circuits with related peripherals, memory, and input/output devices. Accordingly, controller 38 operates in accordance with one or more computer programs defined by computer software. Controller 38 controls receive and transmit parameters such as frequency, timing, spread spectrum coding, polarities, or the like for subscriber unit 24. A second input and a second output of transceiver 40 are coupled to antenna 36 for two-way communication with satellite 20.

Satellite 20 contains digital controller 42 having a first input and a first output coupled bidirectionally to transceiver 44. Controller 42 is desirably configured as one or more conventional microprocessor circuits with related peripherals, memory and input/output devices. Accordingly, controller 42 operates in accordance with one or more computer programs defined by computer software. Transceiver 44 has a second input and a second output bidirectionally coupled to antenna system 46. In the preferred embodiment of this invention, antenna system 46 contains antenna beamformer networks with electronically steerable phased-array antennas 26 configured in a manner well known to those skilled in the art. Desirably, antennas 26 are high-gain antennas capable of generating and independently steering relatively narrow pencil beams 28.

Control station 22 desirably communicates with satellite 20 through dedicated uplinks and downlinks. Bidirectional radio signals are exchanged between satellite 20 and control station 22 through antenna 48 and dedicated beam 29. Antenna 48 is bidirectionally coupled to a first input and a first output of transceiver 50. A second input and a second output of transceiver 50 are coupled to a first input and a first output of controller 52. Controller 52 is desirably configured as one or more conventional microprocessor circuits with related peripherals, memory, and input/output devices. Accordingly, controller 52 operates in accordance with one or more computer programs defined by computer software. A second input and a second output of controller 52 are coupled to a first input and output of interface 54. A second input and a second output of interface 54 are coupled to PSTN 34.

Figure 3:
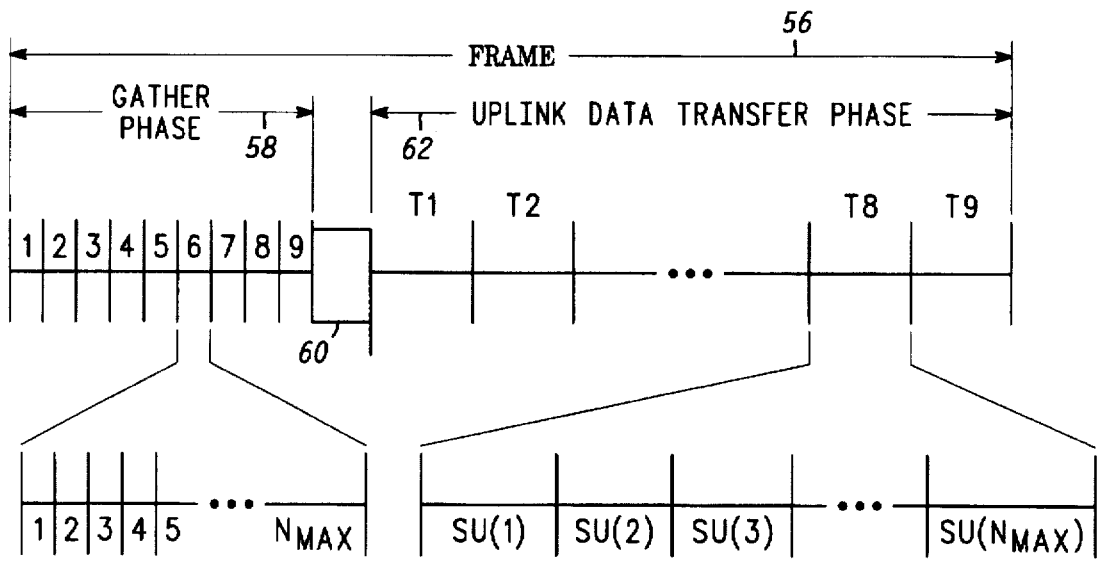
FIG. 3 shows a timing diagram of a frame time interval.

FIG. 3 shows a timing diagram of frame time interval 56. Frame 56 is the time interval during which single steerable beam 28 services single macrocell 32 (see FIG. 1). Generally, call requests for connections from subscriber units 24 or PSTN 34 are gathered in real-time at control station 22 within network 10. FIG. 3 shows that connection request 58 for call requests is divided into nine equal segments. The division into nine segments is arbitrary, and other numbers of segments will work as well. During each connection request 58 segment, call request information is gathered from one microcell 30 of macrocell 32 serviced by beam 28 during frame 56.

FIG. 3 also shows connection request 58 segment for a number six microcell 30 expanded to indicate that there are multiple subscriber units 24 (up to $N_{MAX}$) within each microcell 30. A variety of call requests for connection to network 10 convey a wide variety of bandwidth requirements. For example, requesting subscriber unit 24 configured as a video terminal may require and request a relatively high bandwidth real-time link to transceive the video portion of the connection in addition to the normal voice portion of such a connection. Compared with a video terminal's bandwidth requirements, a typical voice connection's bandwidth requirements are relatively low and a request for such a connection may request only a relatively low bandwidth real-time link. During connection request 58, connection requests gathered from subscriber units 24 may be repeated by satellite 20 to control station 22. Other types of connection requests may request non real-time links of varying bandwidths or data transmission capabilities. Nothing requires bandwidth for uplinks to equal corresponding downlink bandwidths.

After call request information has been gathered at control station 22 for each microcell 30 within macrocell 32, the information may be correlated then transmitted to satellite 20 where it can be acted upon in next frame 56. Satellite 20 uses the information to assign time slots to each subscriber unit 24 based on bandwidth requirements. Satellite 20 uses the correlated data to calculate steerable antenna 26 dwell times for each microcell 30 in each macrocell 32.

Each steerable antenna 26 projects its beam 28 over a multitude of microcells 30 within frame 56. There is a relatively brief gap 60 in frame interval 56 after connection request 58 and before an uplink data transfer interval 62 is initiated. During gap 60, satellite 20 performs calculations on the correlated data in order to determine time slot definitions for each subscriber unit 24 in each microcell 30 for each macrocell 32.

The data traffic portions of calls are implemented using the assigned timeslots during an uplink data transfer interval 62 of frame 56. For the purposes of the present invention, data transfer interval 62 and the coordinated steerable beam activities primarily accommodate an uplink operation. However, those skilled in the art understand that these activities could be performed for a downlink operation as well, or that other schemes may be used to communicate downlink information to subscriber units 24.

Steerable beam 28 dwells (i.e., remains focused for a period of time) on each microcell 30 for an interval that varies according to the total bandwidth requirements of all subscriber units 24 within each microcell 30. The higher the bandwidth requirement for a particular microcell 30, the longer the beam dwell time for that microcell 30. Dwell time for a microcell 30 is the total time that steerable beam 28 projects onto a given microcell 30 as satellite 20 moves in orbit over microcell 30. In FIG. 3, the dwell time for an exemplary microcell 30 labeled T8 is expanded to indicate that the total dwell time for microcell 30 equals the sum of the individual dwell times for each subscriber unit 24 labeled SU(1) through $SU(N_{MAX})$ within the T8 microcell 30. The ability to adjust steerable beam 28 schedule and time slot assignments to the user requests for bandwidth allows network 10 to efficiently manage network resources.

Figure 4:
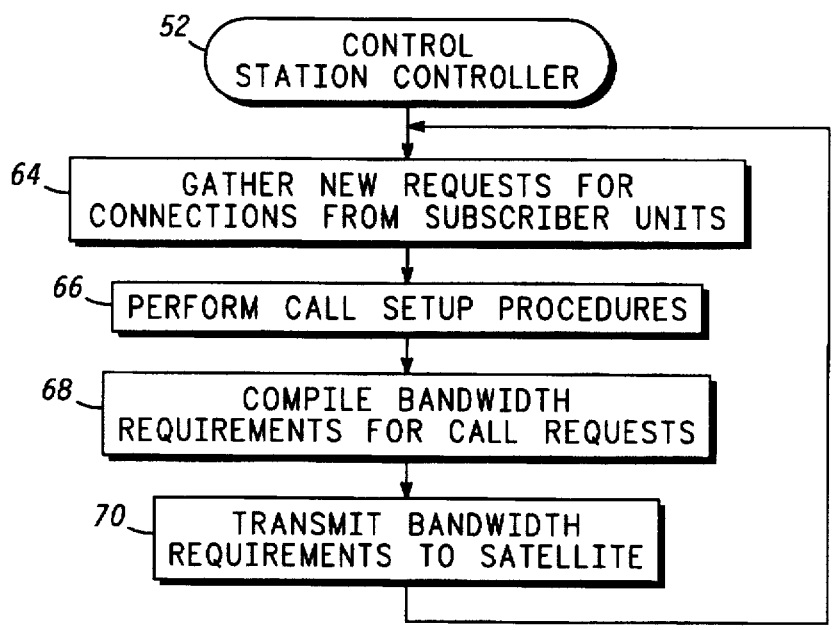
FIG. 4 shows a flow diagram of tasks performed by the control station.

FIG. 4 shows a flow diagram of tasks performed by control station controller 52 as it works with satellite 20 to manage network resources in one embodiment of the present invention. Referring to FIGS. 2–4, new requests for connections come into control station 22 from subscriber units 24 and/or from PSTN's 34, as shown in step 64. A request for a specified uplink bandwidth accompanies each request for a connection. In addition, nothing prevents bandwidth request changes from being received during an established call. Control station 22 then performs routine call setup procedures such as handshaking with a controller for another end of the call, and related functions as shown in step 66. As requests for new connections come into network 10, the bandwidth requirements for each subscriber unit 24 in each microcell 30 are compiled by control station 22 in real-time as shown in step 68. Step 68 may, for example, translate bandwidth requests into time intervals to be assigned during transfer interval 62 of frames 56 for each subscriber unit 24 within footprint 33 (FIG. 1) and make a table (not shown) that associates subscriber unit time intervals with microcells 30.

Next, call request information containing requests for bandwidth is transmitted to satellite 20 using dedicated uplink beam 29 in step 70. After completion of step 70, control station 22 loops back to step 64 and repeats steps 64, 66, 68, and 70 in real-time. As control station 22 executes these steps, it updates and tracks changes in bandwidth requirements and network status as current connections are terminated or handed off to other satellites 20 and new requests are gathered.

Figure 5:
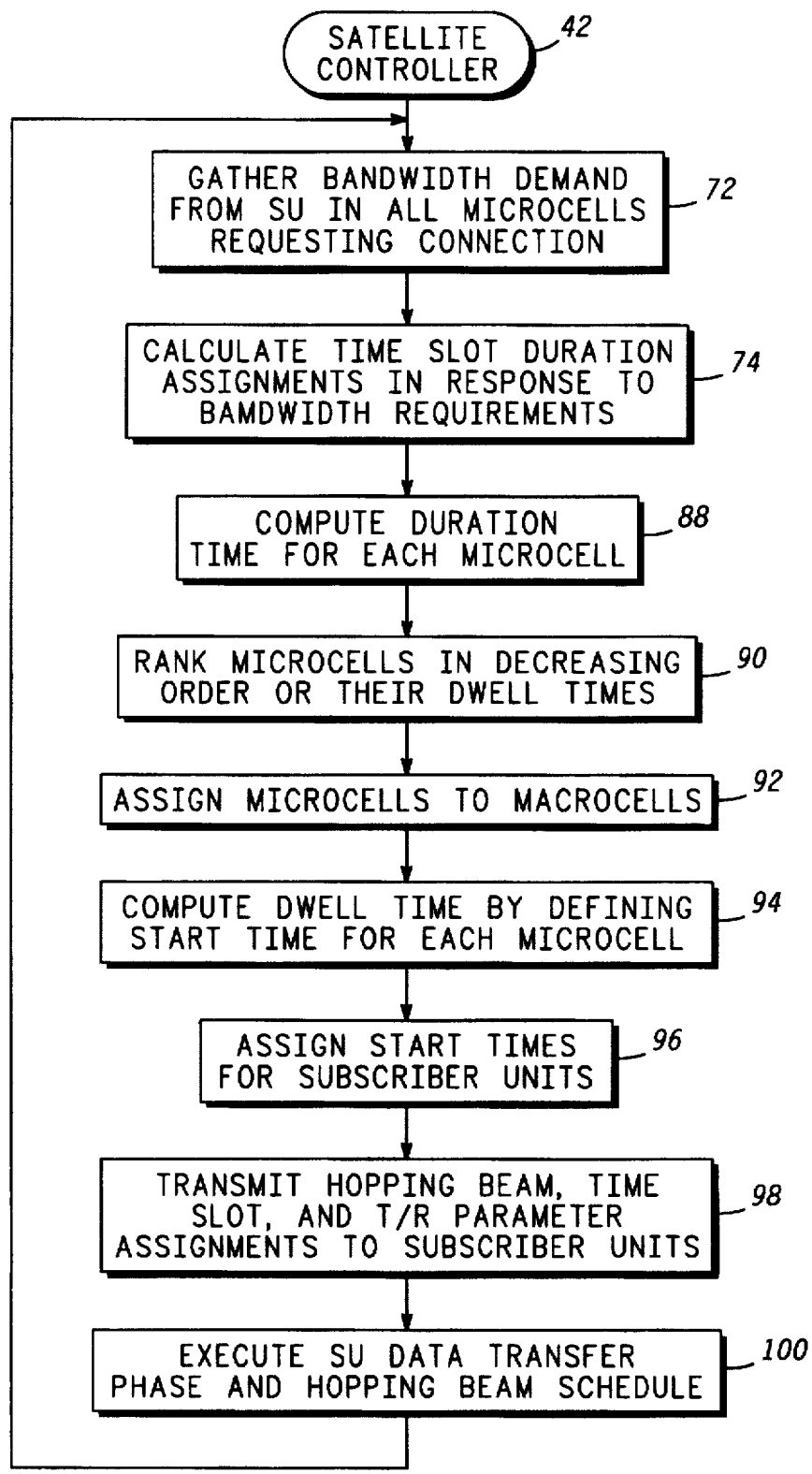
FIG. 5 shows a flow diagram of tasks performed by the satellite.

FIG. 5 shows a flow diagram of steps performed by satellite controller 42 as it assists control station 22 in managing network 10. Referring to FIGS. 2, 3, and 5, controller 42 extracts bandwidth demands made by each subscriber unit 24 within each microcell 30 using information transmitted through dedicated uplink beam 29 from control station 22 to satellite 20, as shown in step 72. Step 72 operates in conjunction with step 70 discussed above (see FIG. 4). Controller 42 continues extracting bandwidth demands for each microcell 30 until all microcells 30 within macrocells 32 have been tabulated. This process of extracting bandwidth requirements for requesting callers occurs prior to transfer interval 62 of frame interval 56. For example, during frame gap 60 controller 42 performs step 74. Step 74 calculates time slot assignments for all ongoing calls for all subscriber units 24 in response to the bandwidth requirements of each call. The higher the bandwidth, the more time that is required by the caller. Desirably, step 74 performs as few calculations as possible, with as many as possible of time slot assignment calculations being performed at control station 52 during step 68 (FIG. 4) to minimize processing requirements placed on satellite 20.

FIG. 6 shows a sample listing of exemplary beam schedule 76. Schedule 76 associates start time 78 and duration 80 for each subscriber unit 24. Each subscriber unit 24 is associated with microcell 30 and corresponding microcell start time 82 and microcell duration 84. Each microcell 30 is associated with a beam or macrocell 32 and corresponding transmit/receive (T/R) parameters 86. Referring to FIGS. 2–3 and 5–6, the time slot assignments performed in step 74 define durations 86 for each subscriber unit 24 in schedule 76. After step 74, a step 88 computes dwell times (i.e., duration) for each microcell 30 by using time slot assignment durations 80 for each subscriber unit 24. The dwell time for each microcell 30 is no shorter in duration than the sum of timeslots durations 80 allocated to all subscriber units 24 within that given microcell 30. Step 88 can, for example, simply add together the timeslot durations 80 of all subscriber units 24 within each microcell 30. The calculations performed in step 88 provide values that appear in microcell duration column 84 of schedule 76.

In order to simplify the assignment of microcells 30 to macrocells 32, step 90 next ranks microcells 30 in decreasing order according to their dwell times as shown in column 84. Those microcells 30 having the higher bandwidth requirements will tend to be serviced first during transfer interval 62 by each steerable beam 28.

After step 90, step 92 assigns microcells 30 to macrocells 32 in a manner responsive to user bandwidth requests. Microcells 30 having no bandwidth requests can be skipped over entirely by steerable beam 28. Step 92 forms an association between microcells 30 and corresponding macrocells 32 in schedule 76. The ordering of microcells 30 performed in step 90 allows larger bandwidth microcells 30 to be assigned first during step 92 when a greater amount of residual bandwidth remains in each macrocell 32. Step 92 is complete when the entire amount of time in transfer interval 62 for each macrocell 32 has been assigned to meet the bandwidth needs of microcells 30 or when all microcells 30 having non-zero bandwidth needs have been assigned to macrocells 32.

Next, step 94 completes computations of dwell times for microcells 30 by defining microcell start times 82 for each microcell duration 84. Step 94 may order microcells 30 within each macrocell 32 as desired to meet interference and antenna imposed constraints. Following step 94, a step 96 assigns start times 78 for each subscriber unit 24 in schedule 76. For each microcell 30 in each macrocell 32, step 96 assigns start times 78 to occur within microcell duration 84 following microcell start time 82. At the completion of step 96, hopping beam schedule 76 has been determined.

Next, step 98 broadcasts the hopping beam and time slot assignment information contained in schedule 76 to individual subscriber units 24. Step 98 notifies each requesting subscriber unit 24 of its particular window of time in which to complete data transfer portions 62 of their requested calls. After step 98 transmits schedule 76, step 100 is performed by satellite 20 to execute schedule 76. In other words, step 100 controls antenna system 46 in accordance with the timing, steering, and transmit/receive parameters set forth in schedule 76. The identification of microcells 30 in schedule 76 defines steering information relative to footprint 33. For each subscriber unit 24 call progress is monitored and call bandwidth needs are updated by control station 22 as calls progress and are completed.

The present invention offers flexible and dynamic sharing of network resources. This is accomplished through a combination of demand-driven access techniques. The advantages of various forms of diversity, including the dimensions of space, time, code, frequency and polarization, can be achieved through the judicious combination of hopping beam and scheduling techniques. Previous methods were generally inflexible and could not adapt to change in real-time variations of traffic and bandwidth requirements.

In summary, although the preferred embodiments of the invention have been illustrated and described in detail, it will be readily apparent to those skilled in the art that various modifications may be made therein without departing from the spirit of the invention or from the scope of the appended claims.

What is claimed is:

1. A method for controlling an antenna system in a communication network to multiplex individual communication links between a network node and subscriber units, the method comprising steps of:

(a) gathering bandwidth requirements from each of the subscriber units;

(b) determining a hopping beam schedule for an antenna beam of the antenna system based on the bandwidth requirements gathered in step (a); and (c) steering the antenna beam in response to the hopping beam schedule.

2. A method as recited in claim 1, wherein the antenna system is steerable to project the antenna beam over cells, and wherein step (b) includes the step of configuring the hopping beam schedule to define dwell times for projecting the antenna beam over the cells.

3. A method as recited in claim 2, wherein step (c) includes the step of steering the antenna beam to project over one of the cells at a time and to project over the cells within a frame.

4. A method as recited in claim 3, wherein the frame includes a connection request and a data transfer interval, and wherein:

step (a) includes the step of occurring during the connection request of the frame; and step (c) includes the step of occurring during the data transfer interval of the frame.

5. A method as recited in claim 3, wherein step (c) includes the step of steering the antenna beam to project over the cells in decreasing order of the dwell times within the frame.

6. A method as recited in claim 2, wherein the cells are microcells and each of the microcells resides within a macrocell and the antenna beam is one of a plurality of antenna beams, and wherein:

step (c) includes the step of steering each of the antenna beams within one of a plurality of macrocells.

7. A method as recited in claim 6, wherein step (b) further comprises the step of configuring the hopping beam schedule to assign the microcells to macrocells.

8. A method as recited in claim 2, wherein the antenna beam is a first antenna beam of the antenna system and the antenna system has a second antenna beam which is steerable to the cells, and wherein:

step (b) includes the step of assigning the cells to the first and second antenna beams.

9. A method as recited in claim 2, wherein the subscriber units reside within the cells, and step (b) includes the step of assigning timeslots to the subscriber units, the timeslots being responsive to the bandwidth requirements for the subscriber units.

10. A method as recited in claim 9, wherein the configuring step includes the step of defining the dwell times to be of no shorter duration than a sum of the timeslots for subscriber units located within common ones of the cells.

11. A method as recited in claim 1, wherein the network node is a satellite in orbit around earth, the subscriber units are earth stations, and the antenna beam is one of a plurality of antenna beams projected toward the earth from the satellite, the antenna beams covering a footprint region of the earth, the footprint region having a macrocell for each of the antenna beams, and each macrocell having a plurality of microcells therein.

12. A method as recited in claim 11, wherein the subscriber units are engaged in calls connected through the communication network, the method further comprises the steps of:

managing call setup procedures for the calls at an earth control station;

compiling, in response to the call setup procedures, the bandwidth requirements; and communicating the bandwidth requirements from the earth control station to the satellite.

13. A method as recited in claim 1, wherein:

step (a) includes the step of gathering the bandwidth requirements substantially in real-time; and steps (b) and (c) include the step of tracking changes in the bandwidth requirements.

14. A method as recited in claim 1, further comprising the step of transmitting the hopping beam schedule from the network node to the subscriber units.

15. A network in which communication links between a network node of the network and subscriber units are multiplexed, the communications links having diverse bandwidth requirements, the network comprising:

the network node;

an antenna system coupled to the network node, the antenna system having antenna beams each of which is individually steerable; and a controller, coupled to the antenna system, the controller being configured to gather bandwidth requirements of the subscriber units, to determine a hopping beam schedule for each of the antenna beams, and to steer the antenna beams in accordance with the hopping beam schedule.

16. A communication network as recited in claim 15, wherein the network node is a satellite in orbit around earth and the subscriber units are earth stations.

17. A communication network as recited in claim 15, wherein the antenna beams are electronically steerable.

18. A communication network as recited in claim 15, wherein the controller is configured to cause the hopping beam schedule to define a plurality of timeslots of each of the subscriber units, to define a hopping beam dwell time for each microcell, and to define microcells to be serviced within a macrocell.

19. A method for controlling an antenna system in a communication network to multiplex communication links between a network node and subscriber units, the communication links each having bandwidth requirements, the method comprising steps of:

(a) gathering the bandwidth requirements from each of subscriber units;

(b) transmitting the bandwidth requirements to the network node;

(c) determining time slot assignments for the subscriber units in response to the bandwidth requirements;

(d) determining a hopping beam schedule for a plurality of antenna beams of the antenna system in response to the bandwidth requirements gathered in step (a);

(e) transmitting the time slot assignments to the subscriber units; and (f) steering the plurality of antenna beams to project over one of a plurality of cells at a time and to project over the plurality of cells within a frame in response to the hopping beam schedule.

* * * * *